July 2, 1929.  J. SHORE  1,719,733
EYE TESTING MACHINE
Filed Dec. 23, 1926   2 Sheets-Sheet 1
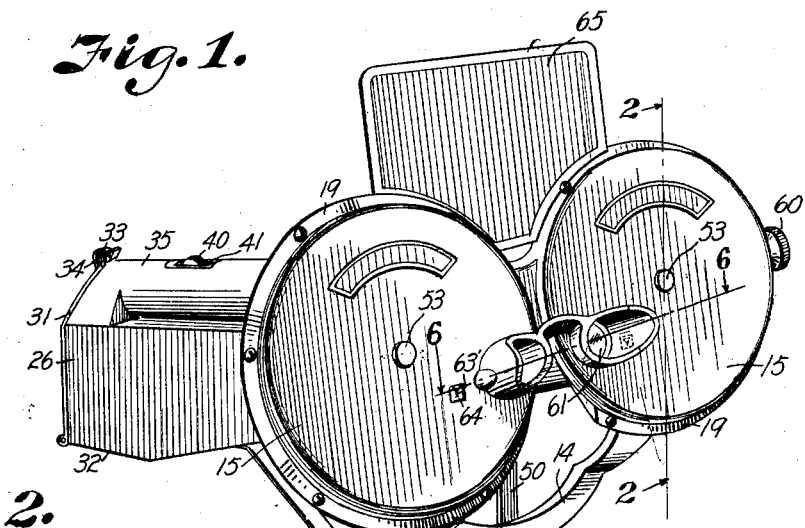
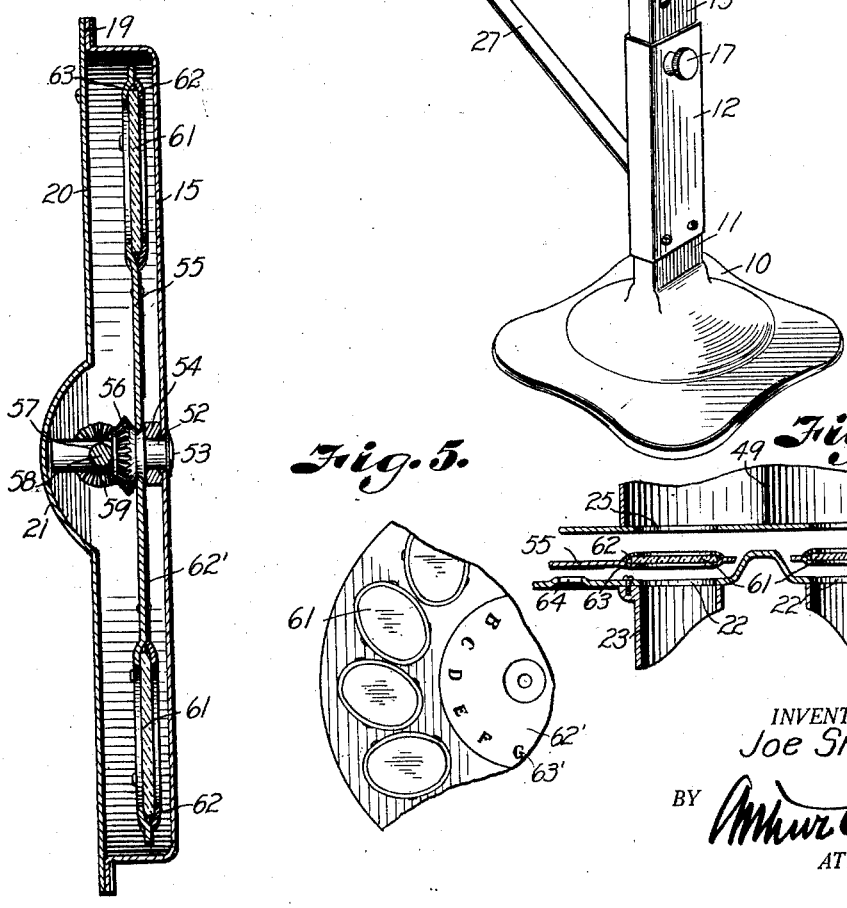
INVENTOR
Joe Shore
BY Arthur E. Brown
ATTORNEY July 2, 1929.    J. SHORE    1,719,733
EYE TESTING MACHINE
Filed Dec. 23, 1926    2 Sheets-Sheet 2
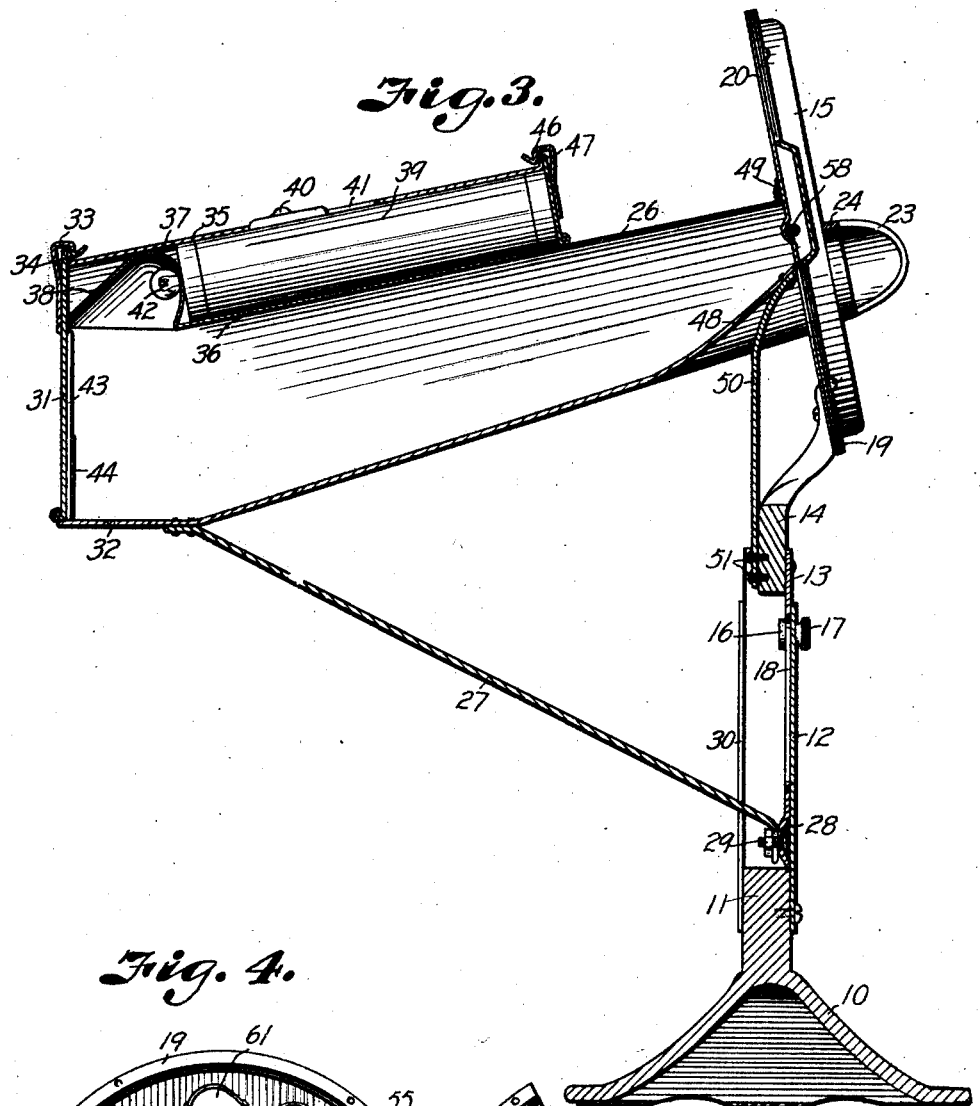
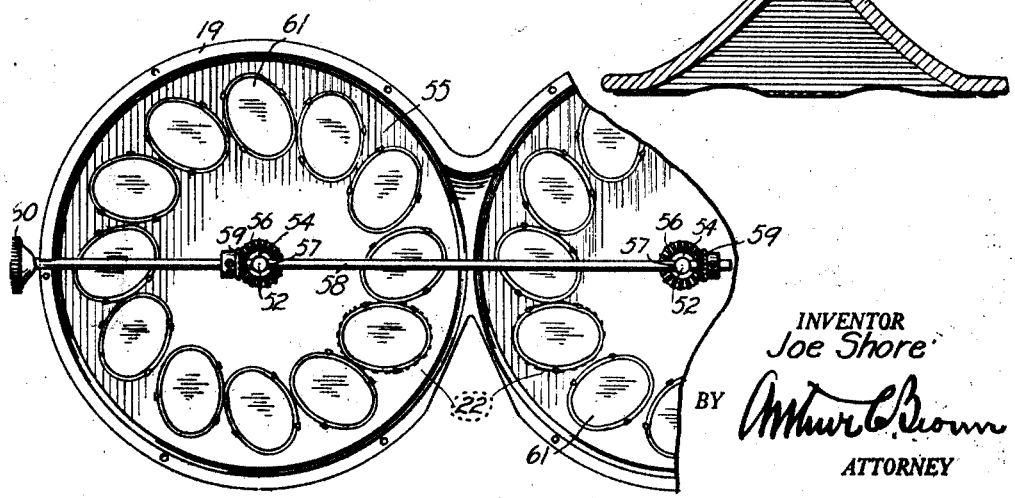
INVENTOR
Joe Shore
BY Arthur C. Brown
ATTORNEY Patented July 2, 1929.

1,719,733

UNITED STATES PATENT OFFICE.

JOE SHORE, OF KANSAS CITY, MISSOURI, ASSIGNOR TO SHORE SELF FIT OPTICAL COMPANY, OF KANSAS CITY, MISSOURI, A CORPORATION OF MISSOURI.

EYE-TESTING MACHINE.

Application filed December 23, 1926. Serial No. 156,569.

My invention relates to eye testing machines and more particularly to a machine for fitting eye glasses.

It is a purpose of my invention to provide a machine for fitting eyeglasses that is operated by the person whose eyes are being tested so that the operator may, by means of said machine, select eyeglasses suitable for his particular use.

It is more particularly a purpose of my invention to provide means for testing the eyes for the purpose of fitting eyeglasses thereto, comprising a pair of lens carriers that are mounted for rotation and which are mounted in back of a cover member having apertures therein that are adapted to align with the lenses on the lens carriers in such a manner that a pair of said lenses will align with the apertures, one lens from each lens carrier being aligned with said aperture and the lens carriers being operated in such a manner that corresponding lenses of the two lens carriers will be in alignment with the two apertures at the same time.

It is a further purpose of my invention to provide means for aligning the eyes with the apertures so that the same will be properly aligned with the lenses that are opposite the apertures and to provide means for holding a test member in the form of a card in predetermined spaced relation to said lenses.

It is also a purpose of the invention to provide new and improved means for driving the rotatable lens carriers and to provide new and improved means for illuminating the test member, said test member and illuminating means being preferably mounted in a housing.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art, and as would fall within the scope of the claims.

In the drawings, Fig. 1 is a perspective view of my improved eye testing machine.

Fig. 2 is an enlarged sectional view thereof taken on the line 2—2 of Fig. 1.

Fig. 3 is a vertical sectional view of the machine.

Fig. 4 is a fragmentary rear elevational view of the lens carriers and associated parts, and Fig. 5 is a fragmentary front elevational view of one of the lens carriers detached.

Fig. 6 is a fragmentary enlarged sectional view taken on the line 6—6 of Fig. 1.

Referring in detail to the drawings:

My improved eye testing machine comprises a base member 10 having an upwardly extending standard 11 thereon to which the tubular member 12 is secured, said tubular member being preferably substantially rectangular in cross section and slidably receiving therein the channel member 13 which is secured to the bracket member 14 carrying the substantially circular housing plates 15. A headed bolt-like member 16 provided with a knurled nut 17 extends through a slot 18 in the member 13 and through an opening in the member 12 to thus adjustably secure the members 12 and 13 together.

Each of the housing plates 15 is provided with a peripheral flange 19 to which the back plate 20 is secured in any suitable manner, said back plate having a central outwardly bowed portion 21. The plates 15 are provided with openings at 22 and tubular guard members 23 are provided extending forwardly from the members 15 in alignment with said openings with which the portions of the face adjacent the eyes are adapted to engage, the bridge piece 24 being provided extending between the members 23, said bridge piece being engaged by the nose to properly position the eyes relative to said openings 22. The back plate 20 is provided with openings 25 aligning with the apertures 22 and an elongated housing 26 aligns with said openings and extends rearwardly from the plates 20. The housing 26 extends slightly downwardly, the members 15, as will be noted from Fig. 3, being slightly inclined so that the upper portions thereof are further back than the lower portions thereof and the member 26 flaring toward the rear thereof.

The member 26 is supported near the rear end thereof by means of the brace 27 which is connected with an inwardly offset portion 28 at the lower end of the member 13 by any suitable means such as the bolt 29. The member 27 extends through a slot 30 in the rear wall of the tubular member 12.

Hinged to the bottom of the member 26 adjacent the rear end thereof is a closure member 31, the same being pivoted to the substantially horizontally extending portion 32 of said housing and being provided with a catch 33 that engages with a lip 34 on the curved top wall 35 of the housing. Said housing is provided with a partition 36 that is substantially in alignment with the forward end of the top of the wall of the housing 26. Said partition is formed into a reflector 37 at the rear end thereof having the inclined portion 38 extending substantially to the closure member 31. The space between the curved top member 35 and the partition 36 forms a compartment within which the flash light 39 or other tubular battery operated lighting member is mounted, which is provided with the usual switch 40 extending through a slot 41 in a top 35 for operating the same. A lamp 42 on the lighting member 39 extends through a suitable opening in the reflector 37 so as to project light upon the test member 43 which is preferably in the form of a card that is held in place by means of the clips 44 on the closure member 31. The compartment within which the lighting member 39 is mounted is preferably provided with a hinged closure member 45 which is held in closed position by means of a catch 46 engaging with a lip 47 extending upwardly from the top 35 of the housing 26.

It will be seen that the housing is thus provided with an offset portion within which the lighting means is situated, the lighting means thus not interfering in any manner with the field of vision through the housing obtained by looking through the apertures 25. The housing is provided with flanges 48 and 49 by means of which the same is secured to the bracket member 50 extending upwardly from the bracket member 14 and to the rear plate 20. The bracket member 50 is secured at the lower end thereof to the member 14 by any suitable securing means such as screws 51.

Mounted on each of the members 15 in fixed position thereon is a stationary shaft 52, the same being secured in place by being headed over as at 53 and being provided with a spacing member 54 to space the rotatable disk like lens carrier 55 the proper distance from the housing member 15 upon which the same is mounted.

A bevel gear 56 is mounted to rotate with each of the members 55 and is rotatable on the shaft 52. Each of the shafts 52 is provided with an opening 57 through which the transversely extending shaft 58 extends, said transversely extending shaft 58 having bevel gears 59 secured thereto so as to rotate therewith and being rotated by means of the knurled knob 60 on one end thereof.

The arrangement of the gears 56 and 59 is such that the members 55 will be rotated in opposite directions upon rotation of the member 60 which will be obvious from Fig. 4. Each of the members 55 is provided with a plurality of openings in which the lenses 61 are mounted, said lenses 61 being held in position by means of the curved plates 62 and 63 provided around the openings in the members 55. The lenses are all arranged with their longitudinal axes lying at an angle to the radial, the angularity of said axes for all the lenses being the same, but the lenses of one member having their longitudinal axes extending at an angle opposite to that of the lenses of the other member 55 relative to the radial, so that, when the lenses are turned into position opposite the openings 22 which are located below the line connecting the centers of the rotatable members 55, the axes of the pair of lenses in alignment with the apertures will be aligned with each other.

Indicating members such as the plates 62' are provided on the members 55 in proper relation to the lenses so that the characters 63' thereon will indicate the lenses in alignment with the openings 22 when said characters align with the openings 64 in the housing members 15.

It will be obvious that a person can test his eyes by operating the member 60 when his face is placed in such a position relative to the device that his nose will engage with the bridge piece 24 and his eyes will be aligned with the guard members 23, by looking through the various lenses aligned with the openings 22 until he finds the proper ones for most clearly reading the test characters on the test member 43. The proper lenses for this process will then be indicated by the character 63 visible through the opening 64, thus enabling the glasses with the lenses corresponding to the character 63' to be picked out by the operator of the machine. The plate member 65 may be provided extending upwardly from the machine upon which directions may be printed for the operation of said machine.

What I claim and desire to secure by Letters Patent is:—

1. In a device of the character described, a housing having an elongated body portion, a closure member at one end thereof, a test member engaging said closure member, means for illuminating said test member comprising a lamp, means for supplying electrical energy thereto, a switch member having operating means extending through said housing and a reflector for directing the illumination from said lamp to said test member, rotatable lens carriers at the other end of said elongated body portion and circular series of lenses on said carriers, said housing having openings therein adapted to successively align with pairs of said lenses.

2. In a device of the character described, a housing having an elongated body portion, a closure member at one end thereof, a test member engaging said closure member, means for illuminating said test member comprising a lap in the upper part of said housing offset from said test member, means for supplying electrical energy thereto, a switch member having operating means extending through said housing and a reflector for directing the illumination from said lamp to said test member, rotatable lens carriers at the other end of said elongated body portion and circular series of lenses on said carriers, said housing having openings therein adapted to successively align with pairs of said lenses.

3. In a device of the character described, including an elongated housing, a pair of substantially cylindrical housing plates at one end of the housing having their axes parallel with the axis of the elongated housing and sight openings communicating with the elongated housing, lens carriers rotably mounted in the paired housings, lenses arranged in circular series on the respective carriers for selective alignment with the sight openings, a closure member at the opposite end of the elongated housing, a test member on said closure member, an offset chamber in the elongated housing, a lamp in the chamber, means for supplying electrical energy to the lamp, a switch member projected through the wall of the chamber, and a reflector at the end of the chamber for directing illumination from the lamp to said test member.

In testimony whereof I affix my signature.

JOE SHORE.